United States Patent [19]

Harris et al.

[11] Patent Number: 5,697,741
[45] Date of Patent: Dec. 16, 1997

[54] GULL WING STYLE OPENINGS FOR SAFETY CHAIN POCKETS

[75] Inventors: Steven C. Harris, Martinsburg, W. Va.; Christopher N. Goetz, Greencastle, Pa.

[73] Assignee: Jerr-Dan Corporation, Greencastle, Pa.

[21] Appl. No.: 525,097

[22] Filed: Sep. 8, 1995

[51] Int. Cl.$^6$ .................. B60R 9/00; B60P 7/00
[52] U.S. Cl. .................. 410/116; 410/23; 410/96; 410/106; 410/101; 410/156; 24/116 R; 414/563; 296/37.6
[58] Field of Search ............... 410/10, 11, 23, 410/50, 97, 96, 116, 102, 156, 101, 106; 24/116 R, 130, 129 A, 129 B; 59/93; 296/37.1, 37.6; 414/563; 280/727; 152/214, 215; 81/15.8

[56] References Cited

U.S. PATENT DOCUMENTS

| | | | |
|---|---|---|---|
| 2,908,529 | 10/1959 | Davidson | 24/116 R X |
| 3,375,557 | 4/1968 | Parr . | |
| 3,545,200 | 12/1970 | Fagan . | |
| 3,820,817 | 6/1974 | Harold | 410/23 |
| 4,176,874 | 12/1979 | Archer . | |
| 4,238,895 | 12/1980 | Hetrick . | |
| 4,239,275 | 12/1980 | Horneys et al. | 410/26 X |
| 4,241,575 | 12/1980 | St. Germain | 59/93 |
| 4,247,966 | 2/1981 | Labbe . | |
| 5,028,183 | 7/1991 | Huddle et al. | 410/23 X |
| 5,133,633 | 7/1992 | Grata . | |
| 5,251,947 | 10/1993 | Kirila, II et al. | 410/97 X |
| 5,309,706 | 5/1994 | Lasaroff et al. . | |

Primary Examiner—Stephen Gordon
Attorney, Agent, or Firm—McDermott, Will & Emery

[57] ABSTRACT

A safety chain storage pocket for use with a tow truck comprises a user access surface with a gull wing opening defining a chain access opening providing safety chain exit and storage from and to the pocket. A pair of slotted wings extend from the opening to provide a pair of chain locking positions. The opening has a lower surface providing free movement of the safety chain out of the pocket by allowing the weight of the chain to assist the user to pull the chain out of the pocket, and the chain access opening allows the user vertical access into the pocket to use the weight of the chain to store the chain in the pocket. The slotted wings extend proximate to the chain access opening to provide a locking position for said safety chain.

25 Claims, 6 Drawing Sheets

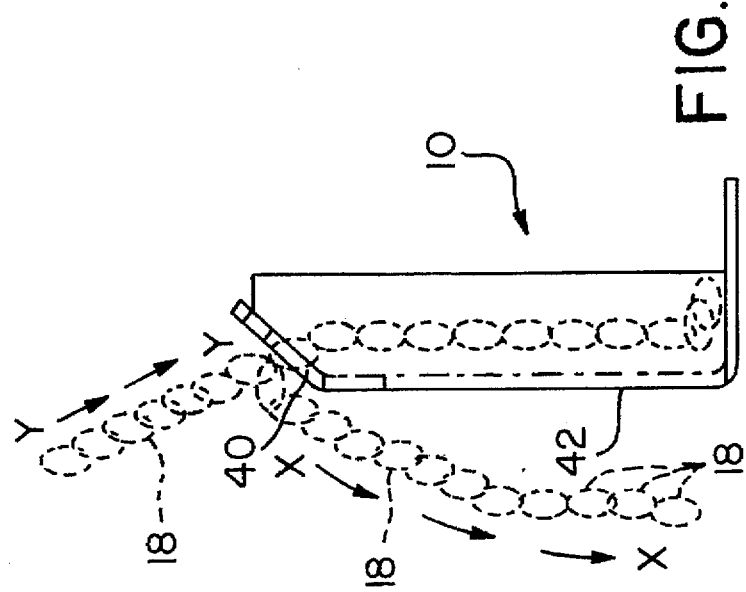
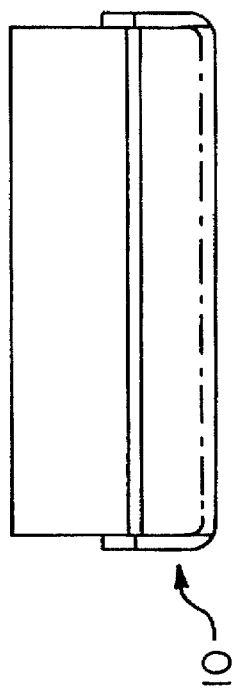
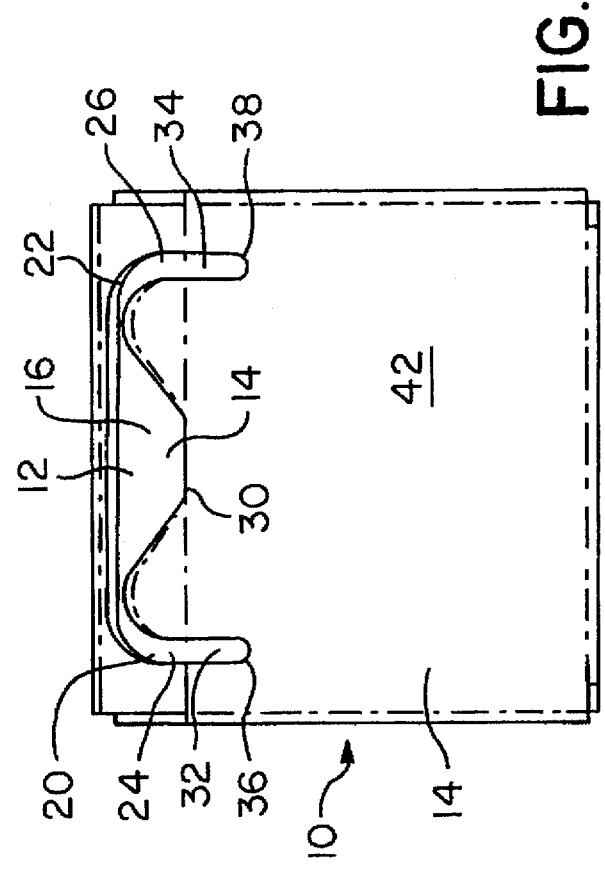

GULL WING STYLE OPENINGS FOR SAFETY CHAIN POCKETS

BACKGROUND OF THE INVENTION

1. Field of the Invention

The present invention relates to gull wing style openings for safety chain pockets, and more particularly to gull wing style openings for safety chain pockets in combination with a car carrier to secure vehicles.

2. Description of the Prior Art

It is known in the car carrier technology, and particularly roll back car carriers such as described in U.S. Pat. No. 5,133,633 issued to Francis S. Grata on Jul. 28, 1992, entitled LOW-ANGLE SLIDABLY SUPPORTED ROLL-BACK VEHICLE TRANSPORT to use safety chains to secure a towed vehicle to the support surface of a car carrier or the like. Safety chains may be stored in pockets or compartments having an opening to allow the user positioned in front of (or above) access surface to pull the safety chain from the pocket to secure the vehicle to car carrier support surface.

Typically, such chain storage pockets have a slot dimensioned slightly greater in width than a thickness of a chain link to enable the user to secure the hook end of a chain to the chain storage pocket by moving a chain link into a slot. The use of such slots dimensioned to slidably receive a chain link for locking purposes is illustrated in the art, e.g., U.S. Pat. No. 4,176,864 to Archer, U.S. Pat. No. 4,247,966 to Labbe, U.S. Pat. No. 4,238,895 issued to Hetrick and U.S. Pat. No. 5,309,706 issued to Lasaroff.

Various chain storage pockets to store chains for use in securing a vehicle to a car carrier have been utilized, such as placing the exit opening within a generally vertically disposed surface and the "locking" slots on the same surface. However, such an arrangement requires the user to feed the chain into the chain storage opening by incrementally pushing the chain from a horizontal position into the vertically positioned chain storage opening. Other chain storage pockets have openings horizontally placed to enable the user to replace the safety chain from a vertical position without the laborious effort of incremental horizontal feeding. However, such horizontal placement positions the surfaces of the opening against the vertical withdrawal of the chain, thereby requiring the user to use a hand-over-hand vertical motion to incrementally withdrawal the chain from the storage pocket.

Furthermore, prior art storage devices in the car carrier (or wrecker) technology typically use a single locking slot to secure the safety chain to the car carrier. While various prior art devices, such as those illustrated in U.S. Pat. No. 3,375,557 to Parr, and U.S. Pat. No. 3,545,200 issued to Fagan, describe link chain connectors having two spaced apart locking slots to connect chains, none have addressed the egress and storage of safety chains for use in car carriers or wreckers.

Thus, none of the patents described above provides the important advantages of using the weight of the chain to assist the user to both remove and store the chain in a chain storage pocket without the laborious and tiring incremental withdrawal or feeding of the chain. Also, none of the patents described above provides for safety chain pockets which allow the user to quickly slide the chain in either direction, after egress, to a locked position on either side of the chain opening to secure different vehicles, each having different chain securing points or configurations.

SUMMARY OF THE INVENTION

According to the invention, a safety chain storage pocket for use with a tow truck comprises a user access surface with a gull wing opening defining a chain access opening providing safety chain exit and storage from and to the pocket. A slotted wing extend from the chain opening to provide a chain locking position. The chain opening has a lower edge providing free movement of the safety chain out of the pocket by allowing the weight of the chain to assist the user to pull the chain out of the pocket. The chain access opening allows the user vertical access into the pocket so to allow the user to use the weight of the chain to store the chain in the pocket. The slotted wings extend proximate to the chain access opening to provide a locking position for the safety chain.

Preferably, the pair of slotted wings extend from said opening of said gull wing opening, and a distal end of an extension of said slotted wing extends below the lower edge of the opening.

More preferably, the chain access opening is positioned in an upwardly facing surface. The distal end of the extension of the slotted wing is positioned in a generally vertical surface, with the upwardly facing surface intersecting the generally vertical surface.

In another embodiment, a safety chain storage pocket comprises a user access surface with a gull wing opening defining a chain access opening providing safety chain exit and storage from and to the pocket. A slotted wing extends from the opening to provide chain locking positions, and the opening has a lower edge providing free movement of the safety chain out of the pocket by allowing the weight of the chain to assist the user to pull the chain out of the pocket. The chain access opening allows the user vertical access into the pocket so as to allow the user to use the weight of the chain to store the chain in the pocket. The slotted wings extend proximate to the chain access opening to provide a locking position for the safety chain.

In yet another embodiment of the invention, the above safety chain storage pocket is placed in combination with a car carrier for transporting vehicles. The car carrier comprises a bed frame having a deck assembly attached to said bed frame. The deck assembly may be movable relative to the bed frame from a transport position where it extends generally parallel to said bed frame, to a loading position where it extends at an angle relative to said bed frame and contacts the ground for loading of a vehicle to be transported. A safety chain in combination with the above safety chain storage pocket is positioned on the car carrier to secure the vehicle to the car carrier.

In yet another embodiment, the safety chain pocket of the present invention is placed in combination with a vehicle transporter. The vehicle transporter comprises an assembly attached to a mobile support, and the assembly suitable to receive at least one vehicle positioned on the assembly. A safety chain in combination with the above safety chain storage pocket secures the vehicle to the mobile support.

In more detail, the assembly comprises at least one apparatus to support the vehicle upon said transporter, or a power or manual operated longitudinally extensible and retractable lifting and towing apparatus.

As pointed out in greater detail below, this inventive safety chain pocket provides important advantages. By having a chain opening with a lower edge suitable to provide free movement of the safety chain out of the pocket, it allows the weight of the chain to assist the user to pull the chain out of the pocket. The chain access opening allows the user vertical access into the pocket and to use the weight of the chain to store the chain in the pocket. The slotted wing extending proximate to the chain access opening provides a locking position for said safety chain.

Importantly, the safety chain storage pocket of the present invention is not limited in application to tow trucks, but may be utilized in applications other than tow trucks. It may also be used in combination with transport vehicles for securing loads to such vehicles or the like, in marine applications to secure cargo within a ship, or ships or boats to an anchorage. Also, the present invention may be used in any arrangement where a chain is used to secure, adjust or otherwise hold or support an apparatus or structure or vessel, such as positioning metal components of a structure during fabrication of a metal structure.

In particular, the safety chain storage pocket of the present invention is particularly useful in combination with car carriers, vehicle transporters and wreckers having lifting and towing mechanisms or the like to secure or transport vehicles.

The invention itself, together with further objects and attendant advantages, will best be understood by reference to the following detailed description taken in conjunction with the accompanying drawings.

BRIEF DESCRIPTION OF THE DRAWINGS

FIG. 1 is a front view of a front face of a chain storage pocket for a safety chain illustrated in FIG. 3 by directional arrows along phantom lines X—X and Y—Y.

FIG. 2 is a top view of the front face of the chain storage pocket of FIG. 1.

FIG. 3 is a side view of the front face of the chain storage pocket of FIG. 1.

DETAILED DESCRIPTION OF THE INVENTION

Figure 4:
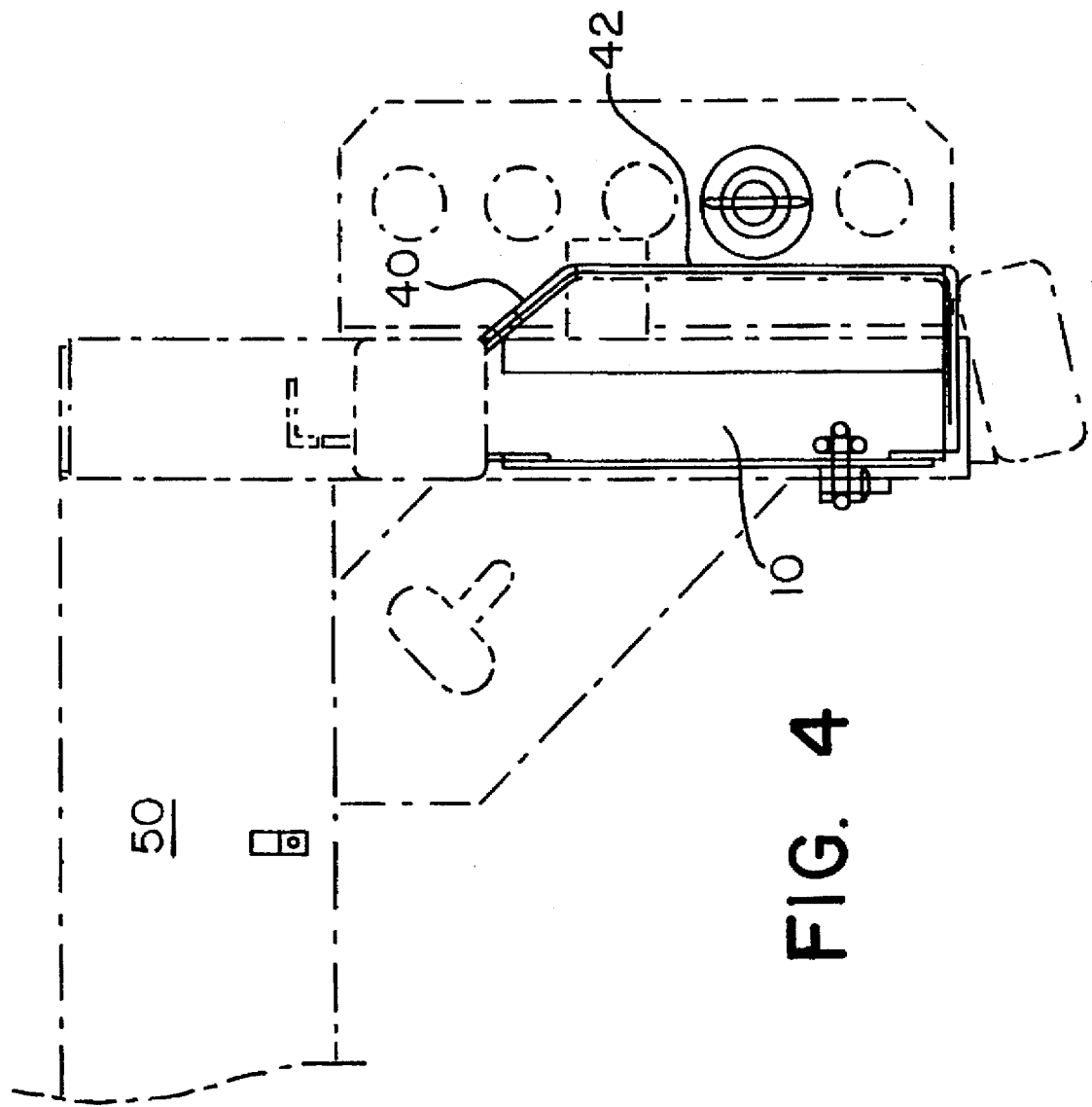
FIG. 4 is a side view of a pair of chain storage pockets of FIGS. 1–3 illustrated on the rear end of a car carrier.

Turning now to the drawings, FIGS. 1–3, a safety chain storage pocket (or "pocket") 10, such as for use with a tow truck, car carrier or the like, comprises a user access surface 14 with a gull wing opening 12 defining a chain access opening (or "chain opening") 16 providing for exit and storage for safety chain 18 (or "chain"), shown in phantom, from and to the pocket. A pair of slotted wings 20,22 extend from the opening 16 to provide chain locking positions as the slotted wings 20,22 define slots 24,26 dimensioned slightly greater in width than a thickness of a chain link of the safety chain 18.

The upper facing opening 16 has a lower surface (or edge) 30 which provides free movement of the safety chain 18 out of the pocket 10 by allowing the weight of the safety chain 18 to assist the user (not shown) to pull the chain 18 out of the pocket 10, as illustrated along line X—X. The chain opening 16 allows the user vertical access into the pocket 10 allowing the user to use the weight of the chain to store the chain in the pocket, as illustrated along line Y—Y. The pair of slotted wings 20,22 define slots 24,26 or openings which extend proximate to the chain access opening 16 to provide a locking position for the safety chain 18.

As shown in FIGS. 1–3, the pair of slotted wings 24,26 extend from the opening 16 of the gull wing opening 12, and extensions 32,34 of the slotted wings 24,26 extend below the lower surface or edge 30 of the chain access opening 16. The opening 16 is positioned in an upwardly facing surface 40 and the extensions 32,34 of the slotted wings 20,22 are positioned in a generally vertical surface 42 wherein the upwardly facing surface 40 intersects the generally vertical surface 42 near the lower edge of opening. The upwardly facing surface 40 intersects the generally vertical surface 42 at about 45°.

As illustrated in FIGS. 1–3, the slotted wings 20,22 allow the safety chain 18 to slide between an unlocked position against the lower edge 30 of the opening 16 to a locked position within the extensions 32,34 of the slotted wings 20,22. The distal ends 36,38 of an extension of the slotted wings 20,22 extends below the lower edge 30 of the opening 16 to provide a secure locking position for the chain links 28.

Figure 5:
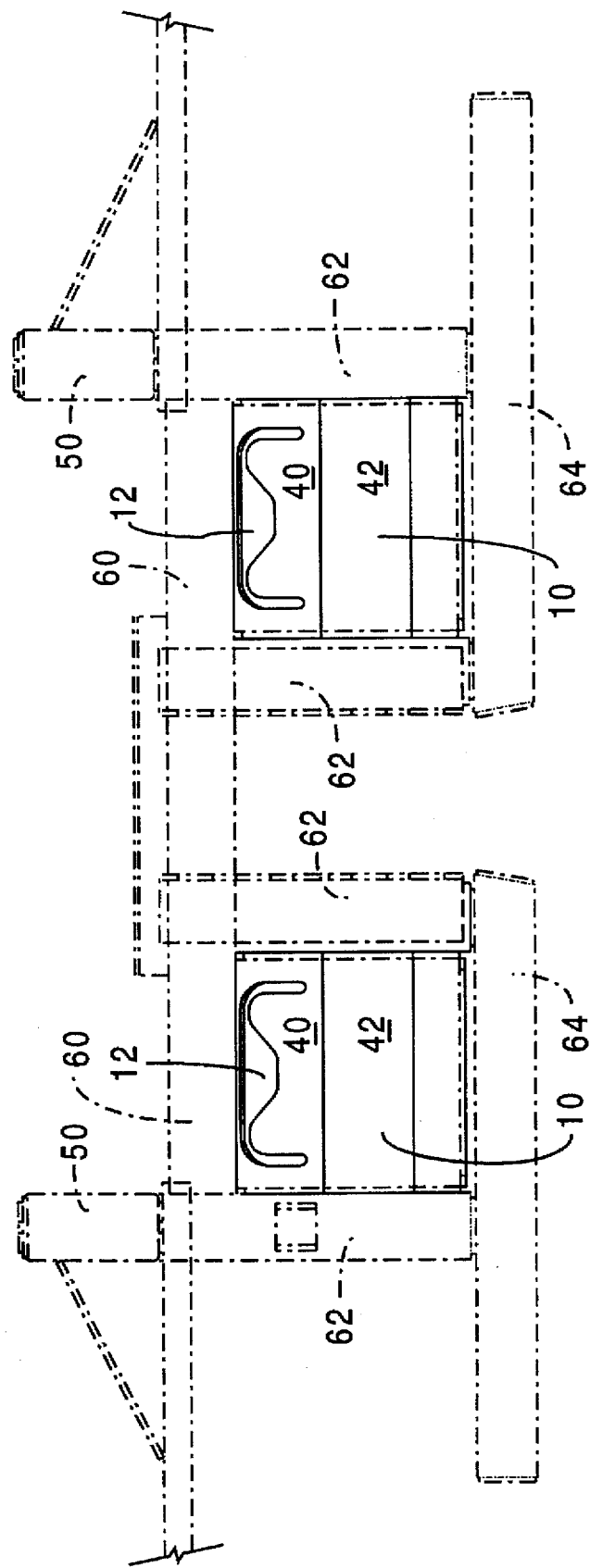
FIG. 5 is a front view of a pair of chain storage pockets of FIGS. 1–3 illustrated on the rear end of a car carrier.

Merely by way of example, FIGS. 4–5 illustrate the use of the safety chain storage pockets 10 positioned on the rear end of a car carrier, such as illustrated in U.S. Pat. No. 5,133,633 entitled LOW-ANGLE SLIDABLY SUPPORTED ROLL-BACK VEHICLE TRANSPORT APPARATUS issued to Francis S. Grata on Jul. 28, 1992, hereby incorporated by reference. As illustrated in FIGS. 1–3 of the Grata '633 patent, a car carrier for transporting vehicles has a bed frame with a deck assembly pivotally attached to the bed frame. The deck assembly pivotally moves relative to the bed frame from a transport position where it extends generally parallel to said bed frame to a loading position where it extends at an angle relative to the bed frame and contacts the ground for loading of a vehicle to be transported. A safety chain is generally used to secure a vehicle to the bed frame.

As illustrated in FIGS. 4–5, the safety chain storage pockets 10 are positioned on the end of a car carrier, such as the frame 50 (or bed frame) by a plurality of supporting members 60,62. By having the twin safety chain pockets and chain, a user faces the user access surface having a chain access opening to grasp the safety chain to provide its exit and storage from and to the pocket. The slotted wings 20,22 extending from the opening 16 provide chain locking positions within the extensions 32,34. In use, the opening 16 has the lower edge 30 which allows free movement of the safety chain out of the pocket by allowing the weight of the chain to assist the user to pull the chain out of the pocket. The upward facing surface 40 having the opening 16 allows the user vertical access into the pocket and to use the weight of the chain to store the chain in the pocket. The slotted wings extending proximate to the chain access opening to provide a locking position for the chain links 28 to engage the slots 24,26 in the slotted wings 20,22 so that the safety chain 18 secures the vehicle to the car carrier.

Figure 6:
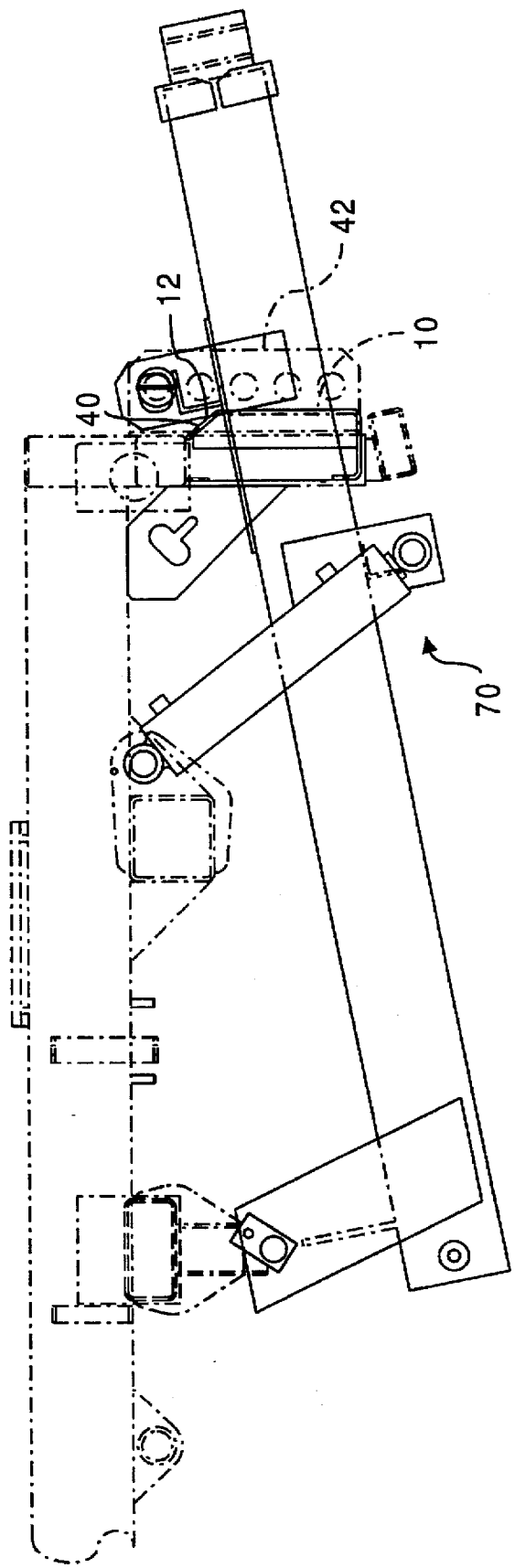
FIG. 6 is a side view of a pair of storage pockets positioned proximate to a tow bar positioned on a tow truck.
Figure 7:
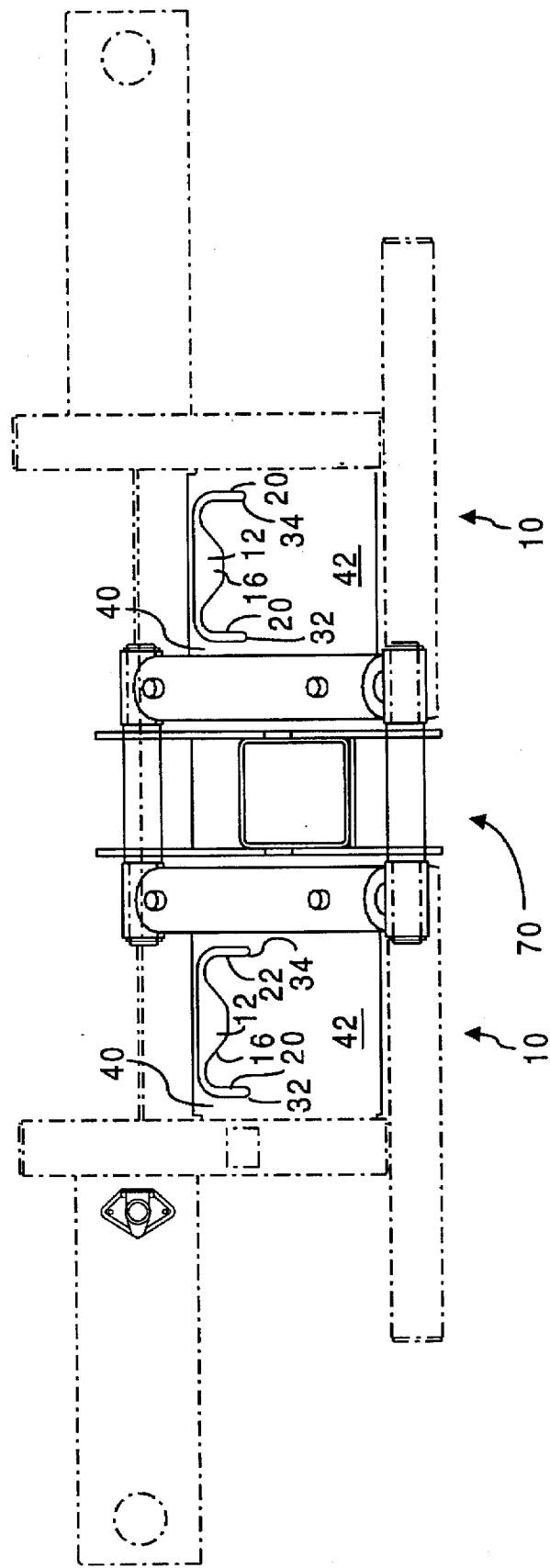
FIG. 7 is front view of a pair of storage pockets of FIG. 6.
Figure 8:
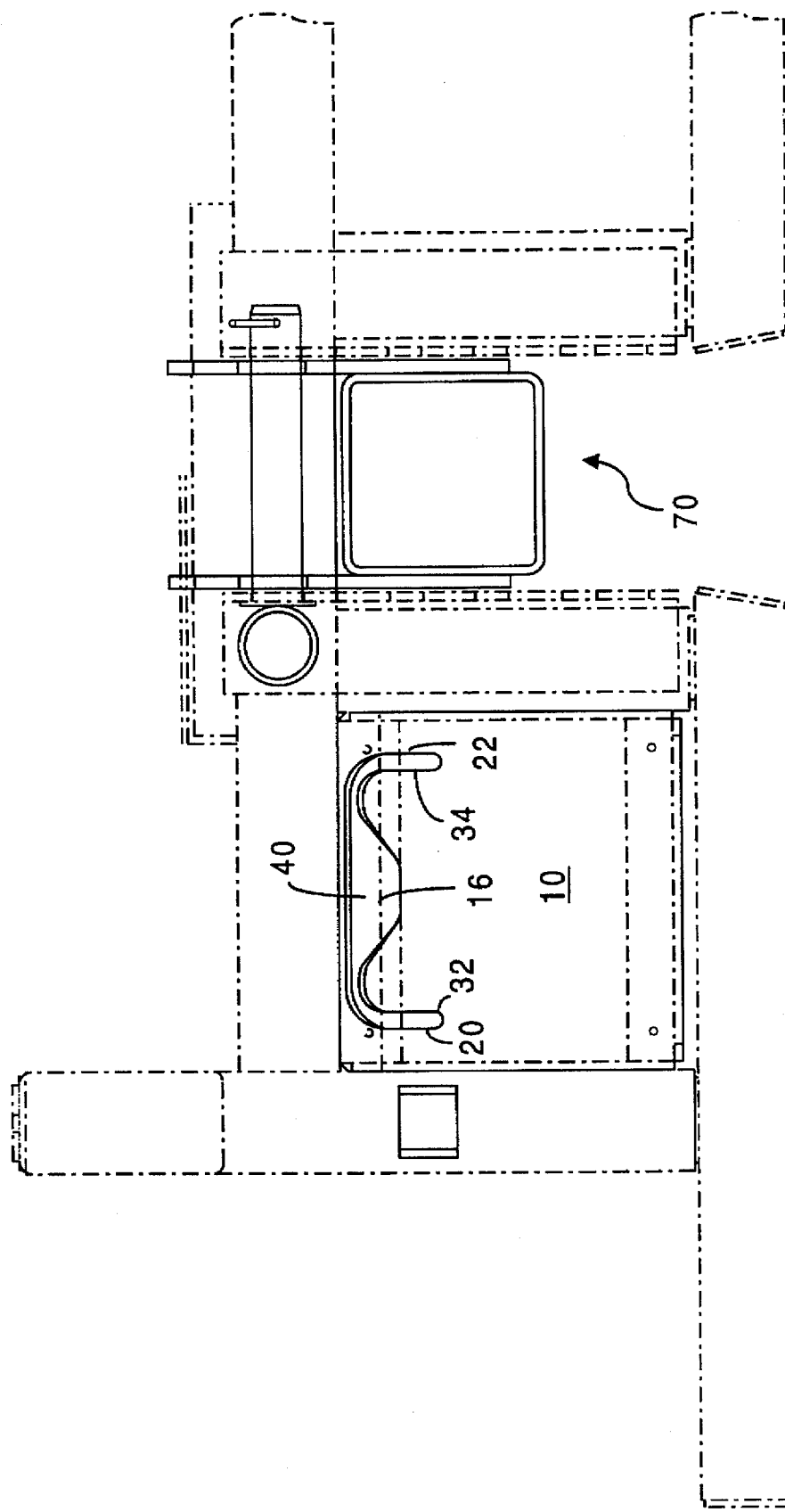
FIG. 8 is an enlarged front view of one of the pockets illustrated in FIG. 7.

In another example illustrated in FIGS. 6–8, the invention may be used in combination with any vehicle transporter comprising a vehicle transporter assembly ("assembly") attached to a mobile support, such as U.S. Pat. No. 4,239,275 entitled VEHICLE TRANSPORTER issued to David C. Horneys et al. on Mar. 5, 1979, hereby incorporated by reference. Typically, as illustrated in FIG. 15 of the Horneys et al. '275 patent, a power or manual operated longitudinally extensible and retractable lifting and towing apparatus suitable to receive at least one vehicle positioned thereon the assembly. By way of the application, the pockets 10 of the present invention may be combined with a power or manual operated longitudinally extensible and retractable lifting and towing apparatus 70 (or apparatus) to secure a vehicle onto the transporter.

Variations on the embodiments described above are possible. For example, the chain opening may be a "V" shape as illustrated in FIGS. 1–4, or may be a "U" or "O" shape or the like. Further, the pair of slotted wings 20,22 in combination with the slots 24,26 and extensions form mirrored "L" patterns when viewed from the top, or mirrored "J", "C", or "G" patterns or like patterns.

In another variation, a user access surface 14 may define curved surfaces, e.g., a curved upwardly facing surface with the slotted wings positioned thereon. Alternatively, either the upward facing surface 40 or the generally vertical surface 42 may be curved in both the generally horizontal direction and the generally vertical direction so long as the principles of chain egress and storage in the invention are followed.

In yet another variation, the chain opening 16 may be centrally located within the gull wing opening 12, or positioned at any convenient position on the user access surface 14. Also, the slotted wings 20,22 need not be symmetrical, but may be of different or varying shapes or configurations suitable to present the advantages of this invention.

In another variation, the upwardly facing surface 40 intersects the generally vertical surface 42 and may be in a range of an intersection between about 30° to about 60°.

In another variation of the invention, the safety chain storage pocket of the present invention is not limited to application to car carriers, tow trucks or the like, but may be utilized in other applications. The invention is particularly useful in combination with transport vehicles to securing loads to such vehicles, or used in marine applications to secure cargo within a ship, or ships to an anchorage.

In yet another variation of the invention, the pockets may be used in any arrangement where a chain is used to secure, adjust or otherwise hold or support an apparatus or structure or vessel, such as positioning metal components of a structure during fabrication of a metal structure or vessel.

The embodiments described above provide a number of significant advantages. The pocket of the present invention allows the weight of the chain to assist the user to pull the chain out of the pocket through use of an opening with a lower surface suitable to provide free movement of the safety chain out of the pocket. The chain access opening allows the user vertical access into the pocket and to use the weight of the chain to store the chain in the pocket. The slotted wing extending proximate to the chain access opening provides a plurality of user friendly locking positions on either side of the opening for the safety chain.

Of course, it should be understood that a wide range of changes and modifications can be made to the preferred embodiment described above. It is therefore intended that the foregoing detailed description be understood that it is the following claims, including all equivalents, which are intended to define the scope of this invention.

We claim:

1. A safety chain storage pocket for use with a car carrier comprising a user access surface with a gull wing opening defining a chain access opening providing safety chain exit and storage from and to the pocket, and a slotted wing extending from the chain access opening to provide a chain locking position, said chain access opening having a lower edge providing free movement of the safety chain out of the pocket by allowing the weight of the chain to assist the user to pull the chain out of the pocket, said chain access opening allowing the user vertical access into the pocket allowing the user to use the weight of the chain to store the chain in the pocket, said slotted wing extending proximate to the chain access opening to provide a locking position for said safety chain.

2. The invention of claim 1 including an additional said slotted wing, said slotted wings extending from said chain access opening of said gull wing opening, and an extension of each of said slotted wings extending below the lower edge of the chain access opening.

3. The invention of claim 2 including an upwardly facing surface including said chain access opening and said user access surface and a generally vertical surface including each said extension of said slotted wings wherein said upwardly facing surface intersects said generally vertical surface.

4. The invention of claim 3 wherein said upwardly facing surface intersects said generally vertical surface at about 30° to about 60°.

5. The invention of claim 1 wherein said slotted wing defines a slot dimensioned slightly greater in width than a thickness of a chain link of said chain.

6. The invention of claim 1 wherein said slotted wing allows said safety chain to slide between an unlocked position against said lower edge of said chain access opening to a locked position within said slotted wing.

7. A safety chain storage pocket comprising a user access surface with a gull wing opening defining a chain access opening providing safety chain exit and storage from and to the pocket, and a slotted wing extending from the chain access opening to provide a chain locking position, said chain access opening having a lower edge providing free movement of the safety chain out of the pocket by allowing the weight of the chain to assist the user to pull the chain out of the pocket, said chain access opening allowing the user vertical access into the pocket and to use the weight of the chain to store the chain in the pocket, said slotted wing extending proximate to the chain access opening to provide a locking position for said safety chain.

8. The invention of claim 7 including an additional said slotted wing, said slotted wings extending, horizontally from said chain access opening of said gull wing opening.

9. The invention of claim 8 wherein an extension of each of said slotted wings extends below the lower edge of the chain access opening.

10. The invention of claim 9 including an upwardly facing surface including said chain access opening and said user access surface and a generally vertical surface including a distal portion of each of said extensions of said slotted wings wherein said upwardly facing surface intersects said generally vertical surface.

11. The invention of claim 10 wherein said upwardly facing surface intersects said generally vertical surface at between about 30° and about 60°.

12. The invention of claim 11 wherein said slotted wings define a slot dimensioned slightly greater in width than a thickness of a chain link of said chain.

13. The invention of claim 10 wherein said slotted wings allow said safety chain to slide between an unlocked position against said lower edge of said chain access opening to a locked position within said slotted wings.

14. A car carrier for transporting vehicles comprising:
   a bed frame having a deck assembly pivotally attached to said bed frame, said deck assembly being pivotally movable relative to said bed frame from a transport position where it extends generally parallel to said bed frame to a loading position where it extends at an angle relative to said bed frame and contacts the ground for loading of a vehicle to be transported;

a safety chain; and a safety chain storage pocket positioned on said car carrier, said safety chain storage pocket comprising a user access surface with a gull wing opening having a chain access opening providing safety chain exit and storage from and to the pocket, and a slotted wing extending from the chain access opening to provide a chain locking position, said chain access opening having a lower edge providing free movement of the safety chain out of the pocket by allowing the weight of the chain to assist the user to pull the chain out of the pocket, said chain access opening allowing the user vertical access into the pocket and to use the weight of the chain to store the chain in the pocket, said slotted wing extending proximate to the chain access opening to provide a locking position for said safety chain to secure said vehicle to said car carrier.

15. The invention of claim 14 including an additional said slotted wing, said slotted wings extending from said chain access opening of said gull wing opening, and an extension of each of said slotted wings extending below the lower edge of the chain access opening.

16. The invention of claim 15, including an upwardly facing surface including said chain access opening and said user access surface and a generally vertical surface including a distal end of each of said extensions of each of said slotted wings.

17. The invention of claim 14 wherein said slotted wing defines a slot dimensioned slightly greater in width than a thickness of a chain link of said chain.

18. The invention of claim 14 wherein said slotted wing allows said safety chain to slide between an unlocked position against said lower edge of said chain access opening to a locked position within said slotted wing.

19. A vehicle transporter comprising an assembly attached to a mobile support, said assembly suitable to receive at least one vehicle positioned on said assembly;

a safety chain;

a safety chain storage pocket positioned on said transporter, said safety chain storage pocket comprising a user access surface with a gull wing opening defining a chain access opening providing safety chain exit and storage from and to the pocket, and a slotted wing extending from the chain access opening to provide a chain locking position, said chain access opening having a lower edge providing free movement of the safety chain out of the pocket by allowing the weight of the chain to assist the user to pull the chain out of the pocket, said chain access opening allowing the user vertical access into the pocket and to use the weight of the chain to store the chain in the pocket, said slotted wing extending proximate to the chain access opening to provide a locking position for said safety chain to secure said vehicle to said mobile support.

20. The invention of claim 19 including an additional said slotted wing, said slotted wings extending from said chain access opening of said gull wing opening, and an extension of each of said slotted wings extending below the lower edge of the chain access opening.

21. The invention of claim 20, including an upwardly facing surface including said chain access opening and said user access surface and a generally vertical surface including each said extension of said slotted wings.

22. The invention of claim 21 wherein said slotted wings define a slot dimensioned slightly greater in width than a thickness of a chain link of said chain.

23. The invention of claim 22 wherein said slotted wings allow said safety chain to slide between an unlocked position against said lower edge of said chain access opening to a locked position within said slotted wings.

24. The invention of claim 19 wherein said assembly comprises at least one apparatus to support said vehicle upon said transporter.

25. The invention of claim 19 wherein said assembly comprises a power or manual operated longitudinally extensible and retractable lifting and towing apparatus.

* * * * *